US008675080B2

(12) United States Patent
Tian et al.

(10) Patent No.: US 8,675,080 B2
(45) Date of Patent: Mar. 18, 2014

(54) MOTION ESTIMATION IN IMAGING SYSTEMS

(75) Inventors: Yu Tian, Palo Alto, CA (US); Peter Dean Swartz, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 221 days.

(21) Appl. No.: 13/156,994

(22) Filed: Jun. 9, 2011

(65) Prior Publication Data

US 2012/0169890 A1    Jul. 5, 2012

Related U.S. Application Data

(60) Provisional application No. 61/428,456, filed on Dec. 30, 2010.

(51) Int. Cl.
  *H04N 5/228* (2006.01)
  *G06K 9/00* (2006.01)

(52) U.S. Cl.
  USPC .............. 348/208.13; 348/222.1; 382/181

(58) Field of Classification Search
  USPC ................. 348/208.4–208.16, 222.1; 382/181–231, 299–300
  See application file for complete search history.

(56) References Cited

U.S. PATENT DOCUMENTS

| 2005/0025342 A1* | 2/2005 | Lee et al. ............... 382/107 |
| 2006/0153476 A1* | 7/2006 | Munsil et al. .......... 382/299 |
| 2008/0074496 A1* | 3/2008 | Venetianer et al. ..... 348/150 |
| 2010/0245674 A1* | 9/2010 | Yamasaki et al. ...... 348/699 |

* cited by examiner

*Primary Examiner* — Sinh Tran
*Assistant Examiner* — Christopher K Peterson
(74) *Attorney, Agent, or Firm* — Graybeal Jackson LLP (57) ABSTRACT

Motion estimation systems and methods are disclosed. An apparatus may include a processing unit to acquire video images and to arrange the video images into a plurality of sequential video frames, and a motion estimation unit that receives the sequential video frames and determines a set of repetitive pattern neighbor candidate vectors for repetitive pattern content in a first frame. The set of repetitive pattern neighbor candidate vectors may be reduced by sorting the set to eliminate spurious repetitive pattern neighbor candidate vectors. The reduced set may be provided to a second adjacent frame. A method may include acquiring a plurality of sequential video frames having a repetitive pattern content, and determining a set of repetitive pattern neighbor candidate vectors for the repetitive pattern content in a first frame of the sequential video frames. The set of repetitive pattern neighbor candidate vectors may be sorted by determining at least one spurious repetitive pattern neighbor candidate vector. The sorted set may be provided to a second adjacent video frame.

19 Claims, 8 Drawing Sheets

MOTION ESTIMATION IN IMAGING SYSTEMS

PRIORITY CLAIM

The present application claims the benefit of copending U.S. Provisional Patent Application Ser. No. 61/428,456, filed Dec. 30, 2010, which application is incorporated herein by reference in its entirety.

TECHNICAL FIELD

This disclosure relates generally to imaging systems and methods, and more particularly to motion estimation systems and methods.

BACKGROUND

In various imaging systems, a continuous image generally includes a plurality of still images that are sequentially viewed. In many cases, however, only minor differences are present in adjacent still images, so that the new information contained in a successive image may be relatively small. For example, in various video compression methods, new data present in successive digital video images may be similarly relatively small, so that data storage requirements may be reduced. Accordingly, video compression methods may desirably enhance video resolution and bandwidth requirements of the video presentation.

BRIEF DESCRIPTION OF THE DRAWINGS

Various embodiments are described in detail in the discussion below and with reference to the following drawings.

SUMMARY

Motion estimation systems and methods are disclosed. In one aspect, an apparatus may include a processing unit to acquire video images and to arrange the video images into a plurality of sequential video frames, and a motion estimation unit that receives the sequential video frames and determines a set of repetitive pattern neighbor candidate vectors for repetitive pattern content in a first frame. The set of repetitive pattern neighbor candidate vectors may be reduced by sorting the set to eliminate spurious repetitive pattern neighbor candidate vectors. The reduced set may be provided to a second adjacent frame.

In another aspect, a method may include acquiring a plurality of sequential video frames having repetitive pattern content, and determining a set of repetitive pattern neighbor candidate vectors for the repetitive pattern content in a first frame of the sequential video frames. The set of repetitive pattern neighbor candidate vectors may be sorted by determining at least one spurious repetitive pattern neighbor candidate vector. The sorted set may be provided to a second adjacent video frame.

DETAILED DESCRIPTION

Imaging systems and methods that may be configured to perform motion estimation are disclosed. Briefly, and in general terms, motion estimation may be important in various video compression and video processing systems. In various motion estimation systems and methods, one or more motion vectors may be generated that describe the relative displacement of a pixel or even a predetermined block of pixels from a reference frame to a current frame, which may result from a motion. The motion may result from a motion of an object appearing in a frame, or a panning motion of a camera that records the frame. The one or more motion vectors may be used to determine a best matching block in the reference frame so that interpolated frames may be generated.

In various motion estimation methods, a global motion vector may be generated, which may be of significant importance. For example, in video stabilization, it may be useful to generate global motion information rather than local motion information, since the motion may affect each of the pixels in a selected frame in approximately the same way. In a further example, when a camera or recording device is subject to a panning, tilting or zoom motion (e.g., a zoom in or a zoom out motion) of a camera recording the frame, each of the pixels in a frame may be affected in approximately the same manner.

In still other motion estimation methods, it may be desirable to generate motion vectors that may be representative of a true motion of objects in a video sequence. Accordingly, it may be important to generate an internally consistent set of motion vectors rather than generating a motion vector that achieves a best match, according to one or more predetermined criteria. In general terms, motion vectors from neighboring blocks of predetermined size may be used as candidate vectors for a current selected block. Motion vectors from neighboring blocks in previous frames may also be employed, since no motion vectors are generally available for successive frames. Accordingly, the motion vectors may provide relatively consistent motion from frame to frame.

Figure 1:
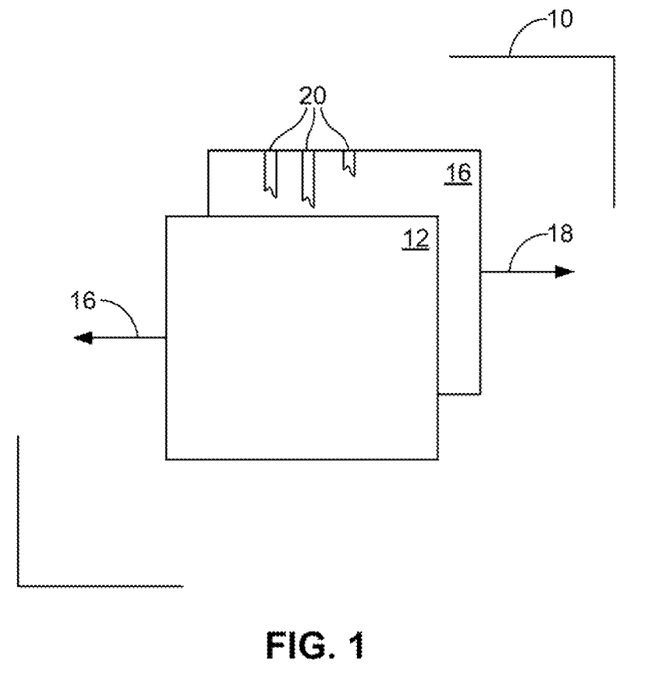
FIG. 1 is a block diagrammatic view of a video frame, according to the various embodiments.

A particular problem with many motion detection methods may involve a level of ambiguity that may occur when repetitive patterns occur in successive video frames. For example, and with reference now to FIG. 1, a video frame 10 may include a foreground object 12 moving in a first direction 14 and a background object 16 that moves in a second direction 18 that may be generally opposite to the first direction 14. The first direction 14 and/or the second direction 18 may generally result from a global panning motion that may constitute a dominant motion within the video frame 10. The background object 16 may include a repetitive pattern 20, shown generally as vertical bars extending along the background object 16 in FIG. 1, although the repetitive pattern 20 may include still other combinations of patterns. The inventors have discovered that if the background object 16 includes the repetitive pattern 20 in the block 10, the presence of the repetitive pattern 20 may generate numerous suitable matches (e.g., numerous motion vectors) in a subsequent or current frame, resulting in one or more motion estimation ambiguities. The motion estimation ambiguities may have various undesirable effects, which may include increasing a processing time, and/or contributing to errors in video images as they are displayed. Accordingly, the various embodiments, as discussed in detail below permit suitable motion vectors to be generated in repetitive pattern areas in video images.

Figure 2:
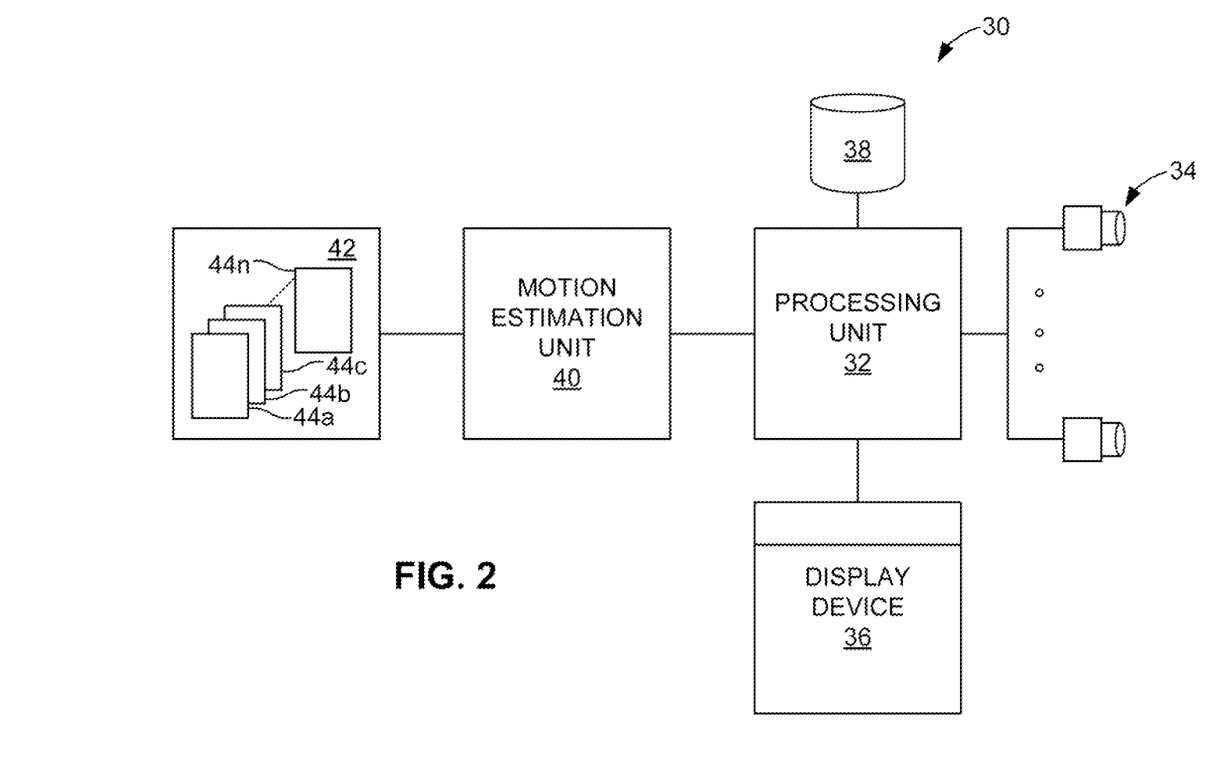
FIG. 2 is a block diagrammatic view of a processing system that may be used to implement motion estimation, according to the various embodiments.

FIG. 2 is a block diagrammatic view of a processing system 30 that may be used to implement motion estimation, according to the various embodiments. The processing system 30 may include a processing unit 32 that may be configured to receive and suitably process video information received from one or more video cameras 34. In general terms, the processing system 30 may include a general purpose computational device that is configured to receive data and processing instructions, and to process the data in accordance with the processing instructions to generate a useful output. The one or more video cameras 14 may include a single, relatively sophisticated camera using an optical lens assembly that transfers a relatively optically-corrected image to an imaging plane, such as a charge-coupled device (CCD) array, or other similar photosensitive imaging arrays. Alternatively, the one or more video cameras 14 may include a plurality of relatively simple video cameras that may use a pin-hole aperture configured to provide sufficient optical diffraction to transfer the image to the imaging plane. In either case, the processing unit 32 may be configured to control the one or more video cameras 34, and to receive and process video information received from the one or more video cameras 34. For example, the processing unit 32 may be operable to exercise exposure control for the one or more video cameras 34, so that objects are suitably resolvable when imaged. The processing unit 32 may also be configured to control a selected motion of the one or more video cameras 34, which may include, for example, a panning motion for the one or more video cameras 34, or to control a zoom lens (provided that the one or more video cameras 34 include a zoom lens arrangement) on the one or more video cameras 34, so that a desired level of object magnification may be achieved.

The processing unit 32 may also be configured to perform various signal processing functions on images received from the one or more video cameras 34. For example, the processing unit 32 may be configured to perform pre-filtering, which may include video de-noising, size conversion, contrast enhancement, de-interlacing and de-flickering, although other pre-filtering may also be performed by the processing unit 32. Intra-filtering, such as de-blocking, and post-filtering may also be performed by the processing unit 32. For example, the processing unit 32 may be configured to perform de-blocking or de-ringing processing.

The processing unit 32 may also be configured to provide suitably processed video images to a display device 36. The display device 36 may include a display having a plurality of light emitting diodes (LEDs), or it may include a device having a plurality of liquid crystal elements arranged in an array and configured to present a visual image to a viewer. Still other devices may include, for example, a plasma display panel (PDP), or other similar display devices. The processing unit 32 may also be configured to store processed (or even non-processed) video images on one or more image storage devices 38 that may be communicatively coupled to the processing unit 32. The one or more image storage devices 38 may include, for example, a mass storage device such as a magnetic disk drive, although other mass storage systems may also be used.

Still referring to FIG. 2, the processing system 30 may also include a motion estimation unit 40 that may be communicatively coupled to the processing unit 32. The motion estimation unit 40 may be configured to perform methods of motion estimation in accordance with the various embodiments, which will be discussed in detail subsequently. Briefly, the motion estimation unit 40 may be operable to access a plurality of video frames 42, which may be identified as, for example, a frame 44a, a frame 44b, a frame 44c and extending to a frame 44n. The frame 44a through frame 44n are generally arranged in a sequential order, so that, for example, frame 44a is recorded before (e.g., occurs prior in time) frame 44b, and frame 44b is recorded before frame 44c. The motion estimation unit 40 may be implemented in various forms. For example, the motion estimation unit 40 may be implemented in software, or it may be implemented in hardware, or using a combination of software and hardware. Although the motion estimation unit 40 is shown in FIG. 2 as a separate unit, it is understood that the motion estimation unit 40 may be incorporated partially or even entirely within the processing unit 32, or even within other units that may be associated with the processing unit 32.

Figure 3:
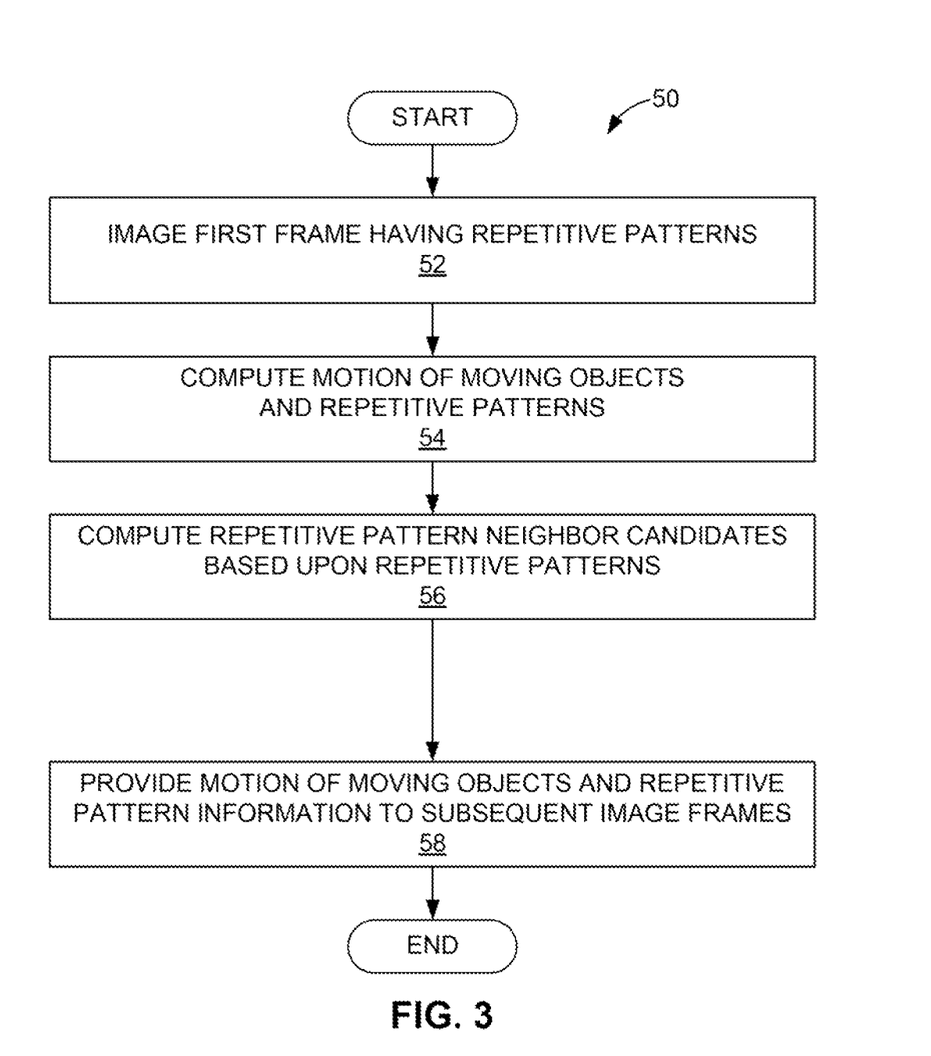
FIG. 3 is a flowchart that will be used to describe a method of motion estimation, according to the various embodiments.

FIG. 3 is a flowchart that will be used to describe a method of motion estimation 50, according to the various embodiments. At 52, a first video image is formed (e.g., by the one or more cameras 34 of FIG. 2). The first video image may include moving objects, and may also include repetitive pattern content, such as, for example, patterns having a similar period, which may extend horizontally, vertically, or at any oblique angle relative to the frame. The repetitive pattern content may also include background content that may be periodic, so that motion vector ambiguity may exist, as discussed in detail above. At 54, a motion for the moving objects and the repetitive pattern content may be computed. In general terms, the motion for the moving objects and the repetitive pattern content may be computed by calculating motion vectors for the moving objects and the repetitive pattern content. At 56, repetitive pattern neighbor (RPN) candidates may be computed for the repetitive pattern content. In accordance with the various embodiments, the RPN candidates may be determined by computing a median value of motion vectors adjacent the RPN motion vector. In the various embodiments, the RPN candidates may be determined by computing the median value of the motion vectors of left and right repetitive motion vectors. In others of the various embodiments, the RPN candidates may be determined by computing the median value of the motion vectors of left and upper right repetitive motion vectors. One method for identifying and removing false positive RPN candidate vectors will be described subsequently. At 58, the motion of the moving objects and the repetitive pattern information may be transferred to subsequent image frames. The repetitive pattern detection may occur at a preprocessing stage, while the RPN candidate vectors may be determined when the motion estimation is performed.

Figure 4:
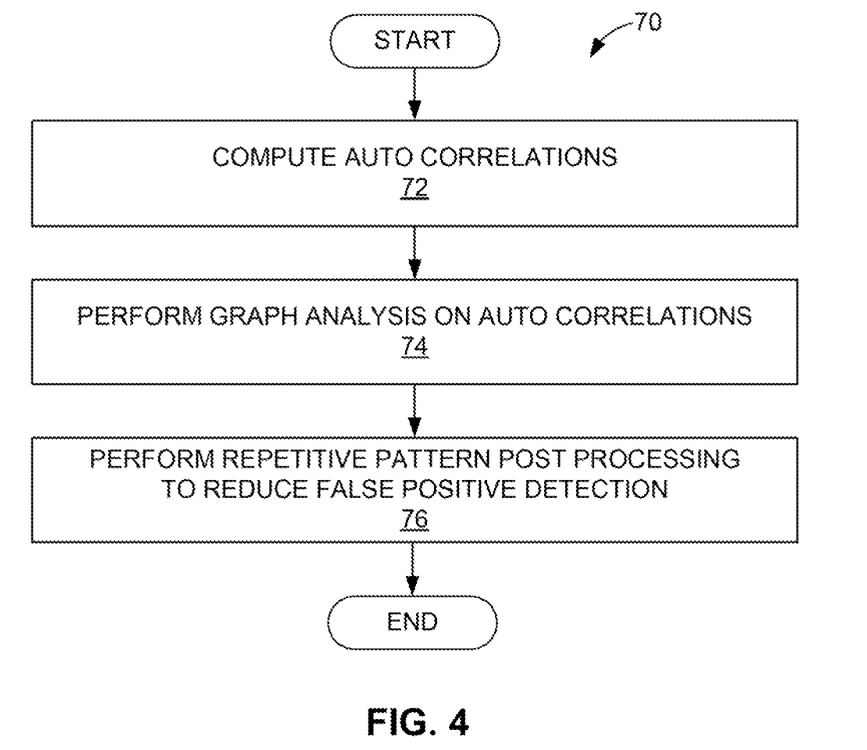
FIG. 4 is a flowchart that will be used to describe a method of identifying and removing extraneous, or false positive RPN candidate vectors, according to the various embodiments.

FIG. 4 is a flowchart that will be used to describe a method of identifying and removing extraneous, or false positive RPN candidate vectors 70, according to the various embodiments. At 72, autocorrelations may be computed for the repetitive pattern content. Since the contrast ratio of the repetitive pattern content may vary, autocorrelation distributions having variable magnitudes may be generated from the repetitive pattern content. Accordingly, a local or a global maximum value for the autocorrelation, a peak-to-valley ratio, a valley sharpness and a valley variance may be different, where the valley may be defined as a local or global minimum value for the autocorrelation. Accordingly, at 74, a graph analysis may be performed for the autocorrelation distribution. The graph analysis may require that a particular location on the autocorrelation distribution corresponding to any of the foregoing locations be determined. For example, in order to determine a desired maximum value for the autocorrelation distribution, a maximum is identified that has relative maxima on either side of the repetitive pattern content. For the maximum to be valid, the valley (e.g., the local minima) on either side of the identified maximum value may be less than half (in absolute terms) of the peak-to-valley value. At 76, if the identified peak value satisfies the criteria of the graph analysis, the identified value is accepted as a valid and acceptable RPN candidate. Otherwise, if the criteria are not satisfied, the RPN candidate is discarded as a false positive detection.

Figure 5:
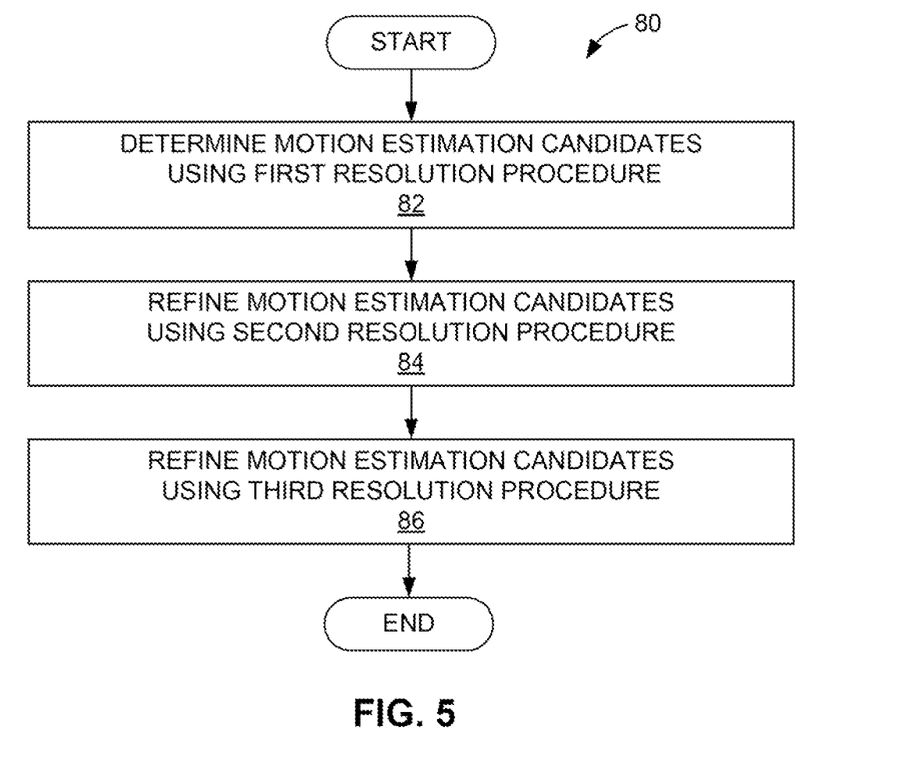
FIG. 5 is a flowchart that will be used to describe a method of motion estimation, according to the various embodiments.

FIG. 5 is a flowchart that will be used to describe a method of motion estimation 80, according to the various embodiments. In general terms, the method 80 may be configured to estimate the motion in a portion of an image by utilizing various levels of resolution when analyzing the image. Accordingly, at 82, motion estimation candidates may be determined according to a first selected level of resolution. For example, the first selected resolution may include a relatively low resolution version of an image that may be used to find a matching block that is consistent with the selected level of resolution. At block 84, the motion estimation candidates located at 82 may be refined by utilizing a second selected level of resolution, where the second selected level of resolution is higher than the first selected level of resolution. For example, the second selected level of resolution employed at 84 may be approximately twice the first selected level of resolution employed at 82, although the second selected resolution may be higher or even lower than twice the first selected resolution. At 86, the motion estimation candidates located at 84 may be further refined by utilizing a third selected level of resolution, where the third selected level of resolution is higher than either the first selected level of resolution used at 82, and the second selected level of resolution used at 84. The various portions of the method 80 will be discussed in detail subsequently.

Figure 6:
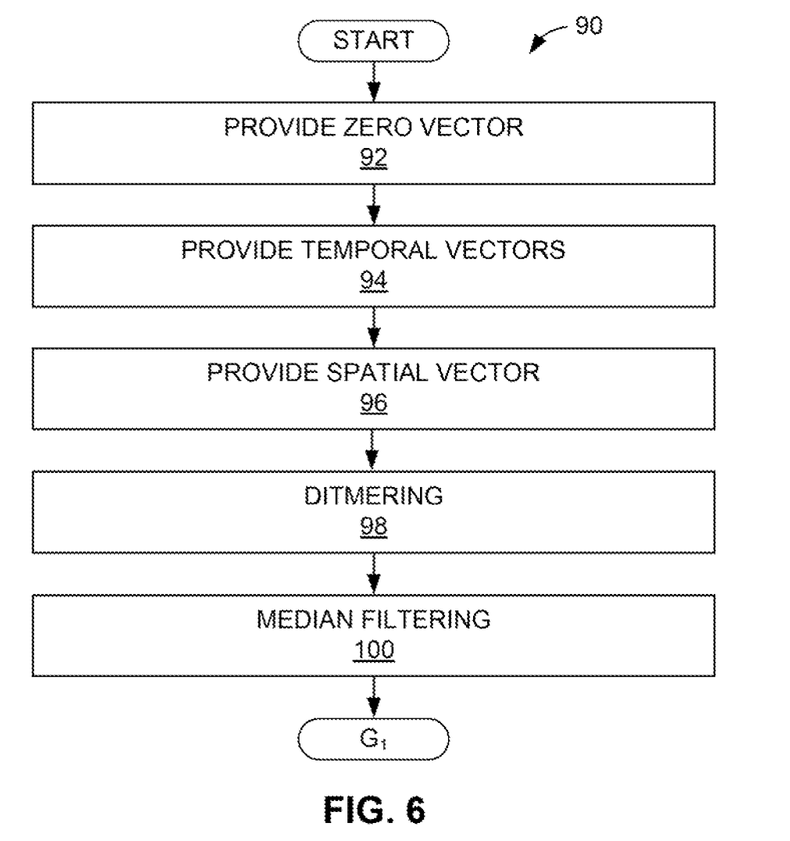
FIG. 6 is a flowchart that will be used to describe a method of determining motion estimation candidates using a first selected resolution, according to the various embodiments.

FIG. 6 is a flowchart that will be used to describe a method 90 of determining motion estimation candidates using a first selected resolution, according to the various embodiments. At 92, a zero motion vector may be provided. In general, the zero motion vector may stem from an assumption that a suitable candidate vector may result from no motion between sequential image frames. Still other candidate vectors may also be employed. For example, a global estimation vector from a previous video frame may also be used. At 94, one or more temporal vectors may be may be provided. The one or more temporal vectors may include a motion vector that was determined for a selected image block in a previous image frame, although other motion vectors may also be used. At 96, one or more spatial vectors may be provided. The one or more spatial vectors may include motion vectors associated with still other previous image frames.

Still referring to FIG. 6, at 98, the vectors introduced at 92, 094 and 96 may be subjected to dithering, in order to suppress undesired artifacts, such as quantization errors. Suitable dithering algorithms may include a Floyd-Steinberg dithering algorithm, although other suitable algorithms may also be used. At 100, a median filtering algorithm may be applied. Subsequent to the filtering at 100, the method 90 generates a first global motion vector ($G_1$) according to the first selected resolution.

Figure 7:
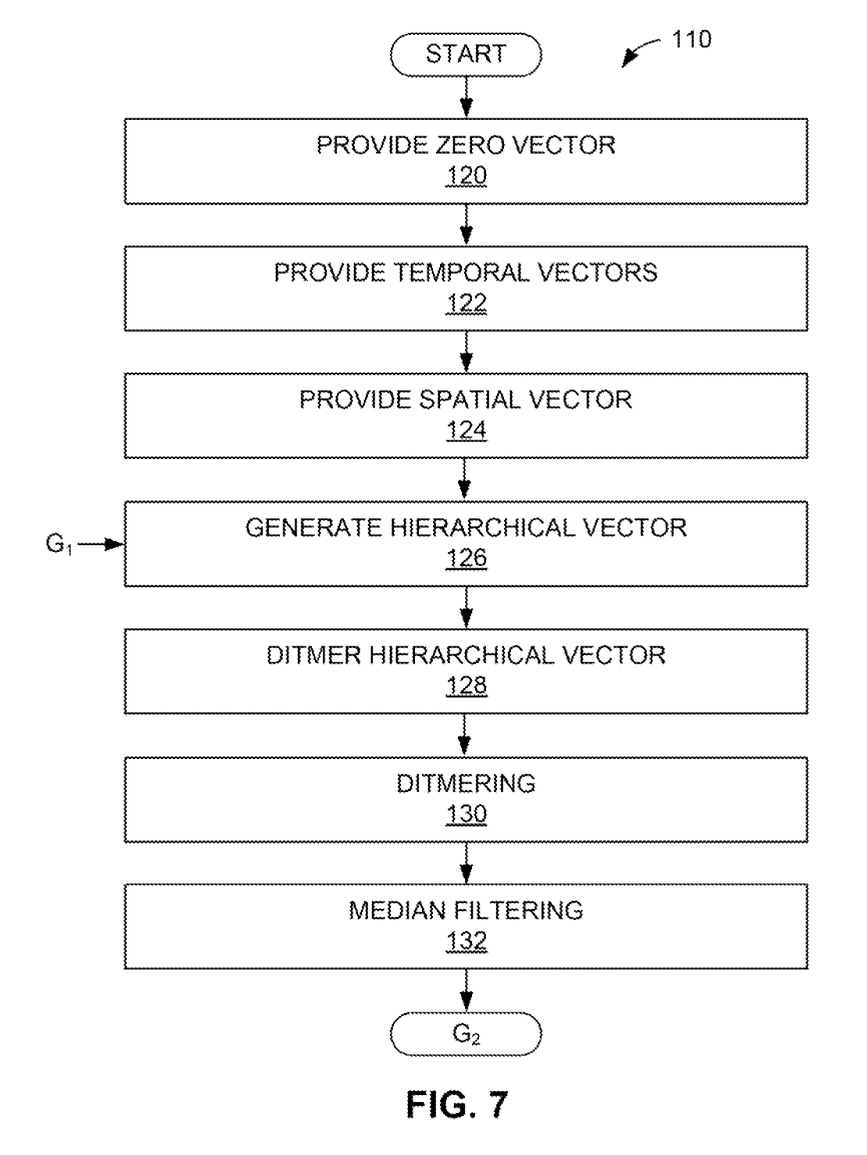
FIG. 7 is a flowchart that will be used to describe a method of determining motion estimation candidates using a second selected resolution, according to the various embodiments.

FIG. 7 is a flowchart that will be used to describe a method 110 of determining motion estimation candidates using a second selected resolution, according to the various embodiments. The method 110 may be applied to determine suitable motion estimation candidates following the determination of motion estimation candidates using the first selected resolution (e.g., the method 90 shown in FIG. 6). At 120, a zero motion vector may be provided, where the zero motion vector may include a suitable candidate vector based upon an assumption of no motion between sequential image frames, for example. At 122, the method 110 may be provided with one or more temporal vectors. The one or more temporal vectors may include one or more temporal vectors determined for a selected image block in a previous image frame, for example. At 124, one or more spatial vectors may be used that may be associated with still other previous image frames. At 126, a hierarchical vector may be generated. The hierarchical vector may be obtained by considering a portion (or sub-area) of the region identified by the vectors found in the method 90 (as shown in FIG. 6), and also the first global motion vector ($G_1$) generated by the method 90. Accordingly, the hierarchical vector permits repetitive blocks to be identified at the higher resolution. At 128, the hierarchical vector may be dithered, using a suitable dithering algorithm. Median filtering may be conducted at 132 to generate a second global motion vector ($G_2$).

Figure 8:
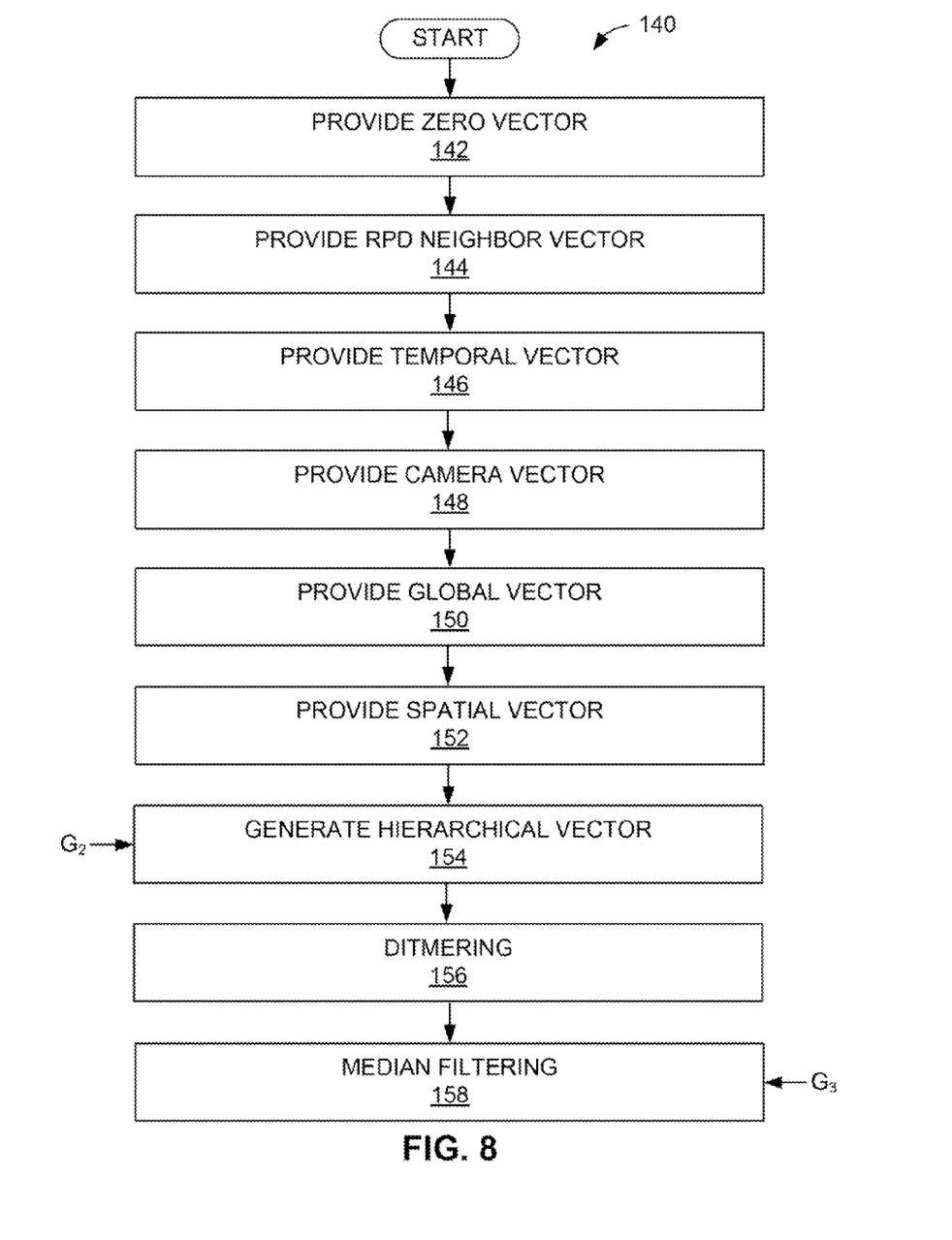
FIG. 8 is a flowchart that will be used to describe a method of determining motion estimation candidates using a third selected resolution, according to the various embodiments.

FIG. 8 is a flowchart that will be used to describe a method 140 of determining motion estimation candidates using a third selected resolution, according to the various embodiments. Again, the method 140 may be applied to determine suitable motion estimation candidates following the determination of motion estimation candidates using the first selected resolution (e.g., the method 90 shown in FIG. 6), and the determination of motion estimation candidates using the second selected resolution (e.g., the method 110 shown in FIG. 7). At 142, a zero motion vector may be provided, for example. At 144, a repetitive pattern determination (RPD) candidate vector may also be provided. In general terms, the RPD candidate vector may include the median value of motion vectors on either opposing sides of the image area. At 146, temporal vectors, as previously described, may also be introduced. At 148, one or more camera vectors may also be provided to the method 140. The one or more camera vectors may include information that describes a panning motion, a zoom motion of a camera, or both. In addition, information that describes other complex motions for the camera may also be included. At 150, one or more global vectors may be introduced, which may have been generated by the method 90 of FIG. 6, and/or the method 110 of FIG. 7, although other global vectors may also be used. At 152, spatial vectors, as previously described, may be employed. At 154, a hierarchical vector consistent with the third selected resolution may be generated. The hierarchical vector may further utilize the second global motion vector ($G_2$) when generated. At 156, the result may be dithered by a suitable algorithm. At 158, the hierarchical vector may be suitably filtered to yield a third global motion vector ($G_3$).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
    a processing unit configured to acquire video images and to arrange the video images into a plurality of sequential video frames; and a motion estimation unit that receives the sequential video frames and is configured to:
  determine a set of repetitive pattern neighbor candidate vectors for repetitive pattern content in a first frame, each repetitive pattern neighbor candidate vector being computed as a median value of adjacent motion vectors;
  reduce the set of repetitive pattern neighbor candidate vectors by sorting the set to eliminate spurious repetitive pattern neighbor candidate vectors; and
  provide the reduced set to a second adjacent frame.
wherein the motion estimation unit is configured to compute a median value of a given repetitive pattern neighbor candidate vector from adjacent repetitive motion vectors to the left ane upper right of the given repetitive pattern neighbor candidate vector.

2. The apparatus of claim 1, wherein the set of repetitive pattern neighbor candidate vectors from the first frame comprises determining the vectors according to a first resolution level.

3. The apparatus of claim 2, wherein the set of repetitive pattern neighbor candidate vectors from the first frame comprises determining the vectors according to a second resolution level that is higher than the first resolution level.

4. The apparatus of claim 1, wherein reducing the set of repetitive pattern neighbor candidate vectors comprises eliminating at least one extraneous candidate vector.

5. The apparatus of claim 4, comprises computing an autocorrelation distribution for a repetitive pattern content in the first frame that is based upon a contrast ratio for the repetitive pattern content.

6. The apparatus of claim 5, wherein at least one of a local or global maximum, a peak-to-valley ratio, a valley variance and a valley sharpness is detected in the autocorrelation distribution.

7. The apparatus of claim 1, wherein the processing unit is coupled to at least one video camera to acquire the video images.

8. The apparatus of claim 1, wherein the processing unit is configured to control at least one of a panning motion and a zoom motion of the at least one video camera.

9. A method, comprising:
  acquiring a plurality of sequential video frames having a repetitive pattern content;
  determining a set of repetitive pattern neighbor candidate vectors for the repetitive pattern content in a first frame of the sequential video frames, each given repetitive pattern neighbor candidate vector being determined as a median value of neighboring repetitive motion vectors to the left and upper right of the given repetitive pattern neighbor candidate vector;
  sorting the set of repetitive pattern neighbor candidate vectors by determining at least one spurious repetitive pattern neighbor candidate vector; and
  providing the sorted set to a second adjacent video frame.

10. The method of claim 9, wherein determining a set of repetitive pattern neighbor candidate vectors comprises computing a median value of vectors adjacent a selected repetitive pattern neighbor candidate vector.

11. The method of claim 8, wherein sorting the set of repetitive pattern neighbor candidate vectors comprises computing an autocorrelation for the repetitive pattern content.

12. The method of claim 11, wherein computing an autocorrelation for the repetitive pattern content comprises performing a graph analysis that identifies a relative maximum value adjacent the repetitive pattern content.

13. The method of claim 12, wherein performing a graph analysis that identifies a relative maximum value comprises:
  locating minima adjacent the relative maximum value;
  computing a ratio of the relative maximum value to the adjacent minima; and
  if the ratio is greater than approximately one-half a magnitude of the relative maximum value, then rejecting the repetitive neighbor candidate.

14. A method of performing a motion estimation in a video image, comprising:
  determining at least one motion estimation candidate vector in a selected image block portion of the video image using a first selected resolution;
  refining the at least one motion estimation candidate vector in the selected image block portion of the video image using a second selected resolution that is greater that the first selected resolution;
  further refining the at least one motion estimation candidate vector in the selected image block portion of the video image using a third selected resolution that is greater than the second selected resolution; and
  wherein the operations of determining and refining include utilizing a median value of adjacent motion estimation candidate vectors to the left and upper right of each motion estimation candidate vector.

15. The method of claim 14, wherein refining the at least one motion estimation candidate vector comprises adopting a second selected resolution that is approximately two times greater than the first selected resolution.

16. The method of claim 14, wherein determining at least one motion estimation candidate vector includes selecting at least one motion vector that assumes no relative motion in the selected image block portion between sequential image frames.

17. The method of claim 14, wherein determining at least one motion estimation candidate vector includes selecting at least one motion vector in the selected image block portion obtained from one or more sequential image frames.

18. The method of claim 14, comprising subjecting the at least one motion estimation candidate vector to a dithering algorithm to generate a dithered motion estimation vector having reduced quantization errors.

19. The method of claim 18, wherein the dithered motion estimation error is subjected to a median filtering algorithm.

* * * * *